Figure 1:
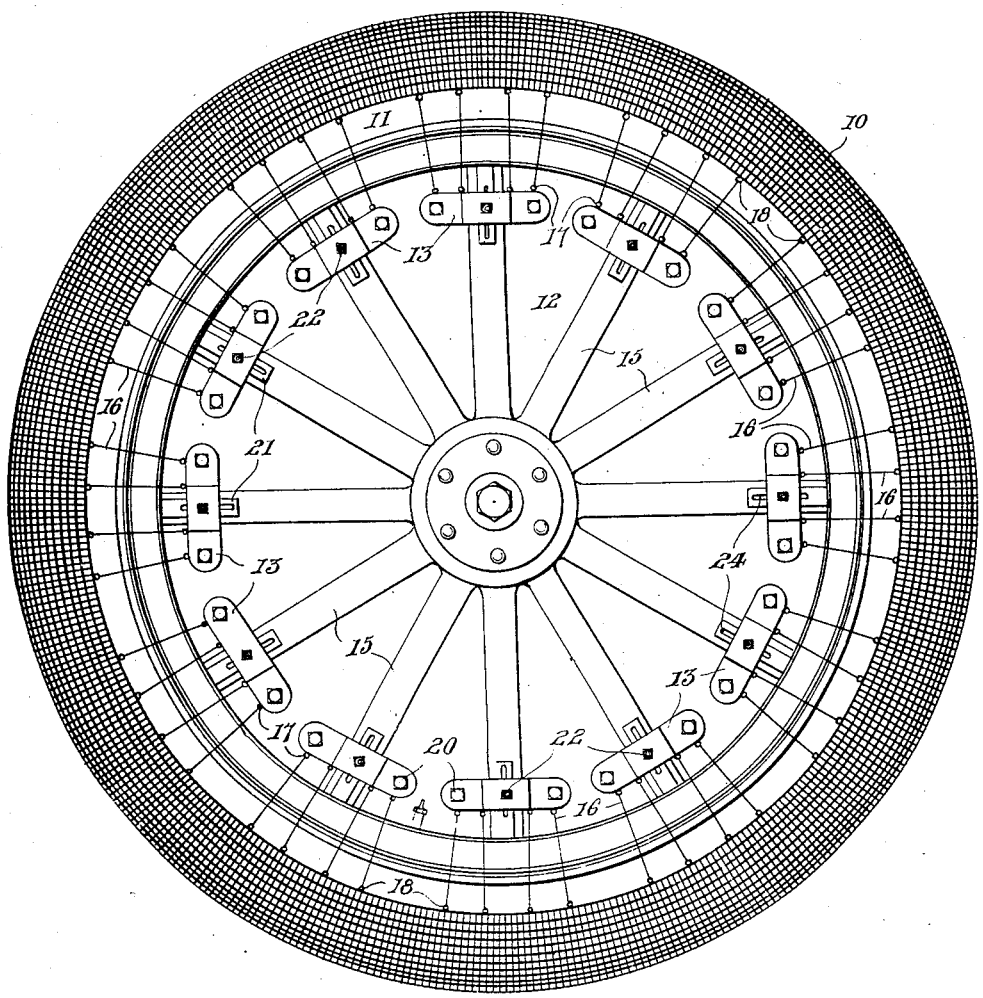

F. BARNIAK.
AUTOMOBILE WHEEL ATTACHMENT.
APPLICATION FILED APR. 14, 1920.

1,360,866.

Patented Nov. 30, 1920.
2 SHEETS—SHEET 1.

Inventor
F. Barniak

By N. M. Wilson

Attorney

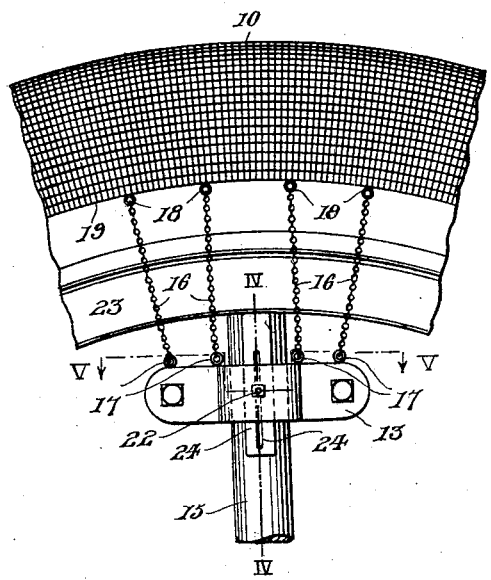
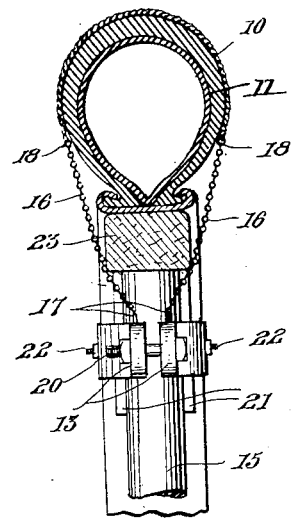
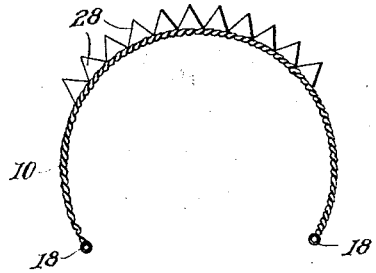
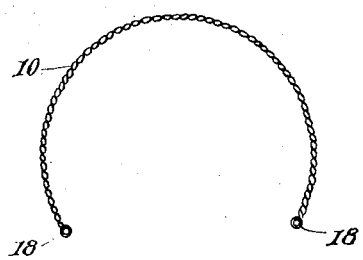
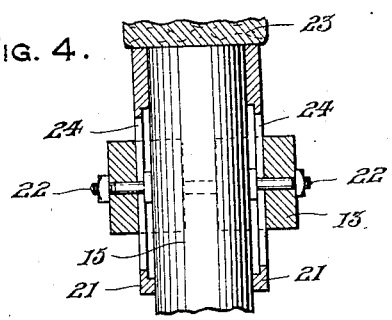
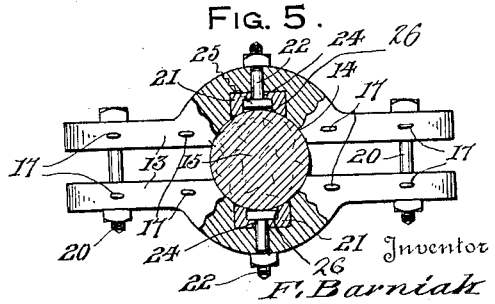

UNITED STATES PATENT OFFICE.

FELIKS BARNIAK, OF ROSEMONT, WEST VIRGINIA.

AUTOMOBILE-WHEEL ATTACHMENT.

1,360,866.  Specification of Letters Patent.  Patented Nov. 30, 1920.

Application filed April 14, 1920. Serial No. 373,947.

*To all whom it may concern:*

Be it known that I, FELIKS BARNIAK, a citizen of Poland, residing at Rosemont, in the county of Taylor and State of West Virginia, have invented certain new and useful Improvements in Automobile-Wheel Attachments, of which the following is a specification.

The primary object of the invention is the provision of a flexible metallic armor tread adapted to be readily mounted on a tire for forming an armor for the tread surface thereof and equipped with means whereby it may be readily adjusted and held in position thereon.

A further object of the invention is the provision of a chain armor or mesh adapted for adjustable positioning upon the tread portion of an automobile tire thereby rendering the same puncture-proof as well as affording a non-slipping traction surface to the wheel, the device possessing great strength and being readily attached upon and removed from the wheel at will.

With these general objects in view, the invention consists of the novel combination and arrangement of parts hereinafter more fully described in connection with the accompanying drawings and in which like reference characters designate corresponding parts throughout the several views.

In the drawings,

Figure 1 is an elevational view of an automobile wheel provided with my invention, Fig. 2 is an enlarged elevational view of a portion thereof, Fig. 3 is a radial sectional view thereof, Figs. 4 and 5 are sectional detail views of the same taken substantially upon lines IV—IV and V—V of Fig. 2, Fig. 6 is a sectional view through the tread portion of the device and Fig. 7 is a view similar to Fig. 6 illustrating a modified form of tread member.

Referring in detail to the drawings, my invention embodies an annular strip of fabric 10 formed of links commonly found in metal fabric fob and watch chains, said fabric being arcuate in cross section and adapted for mounting upon a pneumatic tire 11 of a wheel 12. Adjustable anchoring means for the tread 10 consists of clamp members 13 having arcuate faces 14 for embracing the spokes 15 of the wheel, short chains 16 being connected between eyes 17 upon the clamp members 13 and loops 18 upon the adjacent edges 19 of the tread 10.

Securing bolts 20 connect the adjacent ends of the clamp members 13 together while plates 21 flatly positioned upon the opposite sides of the spokes 15 are adjustably secured to the central portions of the clamp members 13 by bolts 22 forming stops for adjustably positioning the clamp members 13 inwardly of the felly 23 of the wheel.

The bolts 22 are shiftably positioned through longitudinal slots 24 in the plates 21 with the heads 25 of said bolts slidable in longitudinal grooves 26 in the inner faces of said plates. The outer ends of the plates 21 engage the inner face of the felly 23 and by sliding the clamp members 13 upon said plates radially of the wheel 12, the clamp members are adjusted upon the spokes 15 for tightening the tread member 10 by means of the connecting chains 16. The curb link chain or tread 10 provides a substantially impenetrable surface when presented to sharp objects upon the roadway, preventing the pneumatic tire 11 from being punctured as well as affording a non-slipping tread surface for the tire and preserving the tire against wear. The tread 10 is readily mounted upon the tire 11 and removed therefrom when the tire is deflated in the usual manner and upon including the tire with the tread 10 thereon, the clamping members 13 are secured in position upon the spokes 15 for anchoring the tread and preventing the same from creeping around the tire 11. A serviceable armor tread member is provided that may be employed with any form of tire desired and while the form of the invention herein set forth is believed preferable, it will be understood that changes may be made therein, such as the provision of pointed calks 28 upon the outer surface of the tread 10 as illustrated in Fig. 7.

What is claimed as new is:

In combination with the spokes of a wheel, a tire armor anchoring means adjustably secured to said spokes and including a pair of plates having opposed arcuate faces embracing the spokes, means slidable in the arcuate faces of the plates to adjustably support the plates to said spokes and means for fastening said plates against movement relative to one another.

In testimony whereof I affix my signature.

FELIKS BARNIAK.